(12) United States Patent
Zong et al.

(10) Patent No.: US 7,713,904 B2
(45) Date of Patent: May 11, 2010

(54) COMPOSITION FOR DESULFURIZATION

(75) Inventors: Baoning Zong, Beijing (CN); Jinyu Zheng, Beijing (CN); Wenhua Xie, Beijing (CN); Yong Xu, Beijing (CN); Xuhong Mu, Beijing (CN); Yibin Luo, Beijing (CN); Minggang Li, Beijing (CN); Xingtian Shu, Beijing (CN)

(73) Assignees: China Petroleum & Chemical Corporation, Beijing (CN); Research Institute of Petroleum Processing, SINOPEC, Beijing (CN)

( * ) Notice: Subject to any disclaimer, the term of this patent is extended or adjusted under 35 U.S.C. 154(b) by 0 days.

(21) Appl. No.: 10/562,965

(22) PCT Filed: Jun. 24, 2004

(86) PCT No.: PCT/CN2004/000683
§ 371 (c)(1),
(2), (4) Date: Jul. 10, 2006

(87) PCT Pub. No.: WO2005/000998
PCT Pub. Date: Jan. 6, 2005

(65) Prior Publication Data
US 2007/0060468 A1    Mar. 15, 2007

(30) Foreign Application Priority Data
Jun. 30, 2003    (CN) .................... 03 1 47997

(51) Int. Cl.
B01J 27/195    (2006.01)
B01J 29/06    (2006.01)

(52) U.S. Cl. ............... 502/214; 502/64; 502/67; 502/71; 502/77; 502/79; 502/208; 502/232; 502/240; 502/247

(58) Field of Classification Search ............ 502/64, 502/67, 71, 77, 79, 208, 214, 232, 240, 247
See application file for complete search history.

(56) References Cited

U.S. PATENT DOCUMENTS

| 4,814,316 | A | * | 3/1989 | Pellet et al. ............ 502/214 |
| 5,130,031 | A | | 7/1992 | Johnston et al. |
| 5,376,608 | A | | 12/1994 | Wormsbecher et al. |
| 5,525,210 | A | | 6/1996 | Wormsbecher et al. |
| 5,648,562 | A | * | 7/1997 | Henrick ............ 568/774 |
| 5,855,864 | A | * | 1/1999 | Pinnavaia et al. ......... 423/708 |
| 6,193,943 | B1 | * | 2/2001 | Pinnavaia et al. ......... 423/326 |
| 6,482,315 | B1 | | 11/2002 | Roberie et al. |
| 6,989,444 | B2 | * | 1/2006 | Sultana et al. ........... 540/534 |
| 2003/0144141 | A1 | * | 7/2003 | Bowman et al. ........... 502/302 |

FOREIGN PATENT DOCUMENTS

| CN | 1175482 | 8/1998 |
| CN | 1261618 A | 8/1998 |
| GB | 2356859 | 6/2001 |

OTHER PUBLICATIONS

Krishna et al., Additives Improving FCC Process, Hydrocarbon Processing, 1991, pp. 11, 59-66.

* cited by examiner

Primary Examiner—Elizabeth D Wood
(74) Attorney, Agent, or Firm—Kenyon & Kenyon LLP

(57) ABSTRACT

This invention relates to a composition with desulfurization property, in which the desulfurization component is a kind of molecular sieves with incorporation of vanadium into the skeleton. The composition has high hydrothermal stability and the vanadium is hard to lose.

11 Claims, No Drawings

COMPOSITION FOR DESULFURIZATION

FIELD OF THE INVENTION

This invention relates to a composition for desulfurization, in particular a composition for desulfurization with incorporated vanadium in it.

BACKGROUND OF THE INVENTION

Fluid catalytic cracking (FCC) is a petroleum refining process, which has been applied commercially on a large scale. The FCC feedstocks usually contain sulfur in the form of organic sulfur compounds, e.g. mercaptans, sulfides and thiophenes. The FCC products correspondingly contain sulfur impurities, which were induced into the gasoline fraction in some ratio and then into the gasoline blending pool. With the increasing attention to the environment recently, the limitation of the sulfur content in gasoline fraction is becoming more critical. The limitation is not only advantage to the environmental protection but also important for decreasing the poison degree of sulfur in the catalytic transformer of automobile.

The traditional desulfurization is hydrogenation process used to remove a part of sulfur compounds to decrease the sulfur content of gasoline. The FCC feedstocks can be hydrogenated before cracking alternatively; and the cracked products can be hydrogenated after FCC process. The former is expensive in terms of the capital cost of the equipment and the operation because of the high hydrogen consumption. The later tends to saturate the olefins in the products leading to the lost of octane value.

From the economic point of view, it would be desirable to remove sulfur in the FCC process itself without additional treatment. In order to fulfill this target, some research works have centered on the removal of sulfur from the regenerator stack gases, but actually the sulfur levels of cracking products are not greatly affected through this method (Krishna et. al., Additives Improve FCC Process, Hydrocarbon Processing, 1991, 11, 59-66); other works are removal of sulfur from gasoline directly in FCC process by adding additives with desulfurization properties.

The investigations on the additives with desulfurization properties indicate that some metal elements such as V, Ni, Cu, Cr, Sn, B, Al and Zn etc. have such properties. For example, a desulfurization catalyst GFS and a desulfurization additive GSR for decreasing the gasoline sulfur have been developed by Grace Davison. The desulfurization additive disclosed in U.S. Pat. No. 5,376,608 and U.S. Pat. No. 5,525,210 is a kind of $Al_2O_3$ materials loaded with metals, in which the metal component could be selected from Ni, Cu, Zn, Ag, Cd, In, Sn, Hg, Tl, Pb, Bi, B and Al. The $Al_2O_3$ materials loaded with 5~10 wt % V disclosed in U.S. Pat. No. 6,482,315 show better desulfurization activities from gasoline when used in combination with FCC catalysts contained a zeolite Y as active component.

Chinese patent CN1261618A disclosed a method used for the removal of gasoline sulfur in FCC process. The composition of desulfurization catalysts in this method comprises a porous molecular sieves component, normally a faujasite such as zeolite USY, a metal in an oxidation state above zero value deposited within the pore structure of the sieves, preferably the vanadium, as well as a rare earth component employed to increase the cracking activities.

In catalytic cracking process the FCC catalysts are always used at high temperatures and need a recycle process such as steam stripping and oxidation-regeneration steps. So, the stability especially the hydrothermal stability of the FCC catalysts is very important. The cracking catalysts with desulfurization property mentioned above are formed by supporting metal compounds on matrix. The metal ions are present as exchanged cationic species, which leads to the decrease of hydrothermal stability of the catalysts. At high temperatures the supported metal component could transfer to the molecular sieves and lose desulfurization property. Especially, the transferred metal component vanadium will destroy the structure of the active molecular sieves and result in the deactivation of the FCC catalysts.

SUMMARY OF THE INVENTION

Disclosed is a composition with desulfurization property in which the molecular sieves component with incorporation of vanadium into skeleton is used as desulfurization component. The composition comprises mainly supporter, binder, active component and molecular sieves component with incorporation of vanadium into skeleton. The content of molecular sieves component with incorporation of vanadium into skeleton is from 1 to 20 weight percent, preferred from 7 to 15 weight percent. The ratio of active component and molecular sieves component with incorporation of vanadium into skeleton in the composition is from 1 to 50, preferred from 3 to 20.

The molecular sieves component with incorporation of vanadium into skeleton is selected from one or mixture of more than one of VS-n, VAPO-n and VSAPO-n molecular sieves. Preferred VS-n molecular sieve is VS-1 or VS-2, in which the molar ratio of Si to V is from 10 to 300. Preferred VAPO-n molecular sieve is VAPO-5, VAPO-11, VAPO-17 or VAPO-31, in which the molar ratio of Al to V is from 10 to 300.

The active component of the composition includes large pore size or intermediate pore size zeolites, such as zeolite Y and/or ZSM-5. Zeolite Y could be USY or REUSY or those modified by metal oxides such as ZnO. ZSM-5 Zeolite could be modified by rare earth or both P and rare earth. The supporter is Kaolin. The binder is selected from one or mixture of two or three of silica sol, alumina sol and pseudoboehmite.

DETAILED DESCRIPTION

The object of the invention is to supply a cracking catalyst with high hydrothermal stability without adverse effect on the active structure of the molecular sieves in order to overcome the shortcoming of the cracking catalyst for desulfurization with supported metals in the art.

The FCC catalyst with desulfurization property supplied by this invention is characterized by that the molecular sieves component with incorporation of vanadium into skeleton is used as desulfurization component.

More particularly, the supplied FCC catalyst comprises mainly clay, binder, active component and desulfurization component. The desulfurization component is molecular sieves, in which vanadium is incorporated into the skeleton. The content of the desulfurization component in the catalyst is preferred from 1 to 20 weight percent, more preferred from 7 to 15 weight percent. The ratio of active component to molecular sieves component with incorporation of vanadium into skeleton is preferably from 1 to 50, more preferably from 3 to 20.

The molecular sieves with incorporation of vanadium into skeleton disclosed in this invention are named as vanadium-incorporated molecular sieves, in which the vanadium was introduced into the skeleton of molecular sieves in the form of $V^{4+}$ and was present as skeleton elements. The status of vanadium in the molecular sieves was characterized by FT-IR, ESR and NMR. [See references: Vanadosilicate catalysts prepared from different vanadium sources and their characteristics in methanol to conversion (A. Miyamoto, D. Medhanavyn and T. Inui, Applied Catalysis, 28(1986), 89-103); Synthesis and Characterization of the Vanadium-incorporated Molecular Sieve VAPO-5 (S. H. Jhung, Y. S. UH and H. Chon, Applied Catalysis, 62(1990), 61-72); and Synthesis, characterization and catalytic properties of vanadium silicates with a ZSM-48 structure (A. Tuel and Y. Ben Taarit, Applied Catalysis A: General, 102(1993), 201-204)].

The vanadium-incorporated molecular sieves could be VS-n (e.g. VS-1 and VS-2), VAPO-n (e.g. VAPO-5, VAPO-11, VAPO-17 and VAPO-31 etc.) as well as VSAPO-n. As for VS-n molecular sieves, vanadium and silica are skeleton elements and the preferred molar ratio of Si to V is from 10 to 100. Vanadium, alumina and phosphorus are skeleton elements in VAPO-n molecular sieves and the preferred molar ratio of Al to V is from 10 to 100. In VSAPO-n molecular sieves the molar ratio of Si to Al is arbitrary and both silica and alumina are skeleton elements. The content of vanadium in skeleton is characterized in the molar ratio of Si to V. The phosphorus content of either VAPO-n or VSAPO-n molecular sieves has no significant effect on the cracking and sulphur reduction property of the FCC catalyst.

The active component of the catalyst disclosed in this invention is that widely used in traditional FCC catalysts. They could be large pore size or intermediate pore size zeolites, such as zeolite Y and ZSM-5. Zeolite Y could be obtained by modification, such as USY, REY, REUSY or zeolite Y containing metal elements modified by metal oxides. ZSM-5 could be modified either by rare earth or by both P and rare earth (named as ZRP, such as those disclosed in CN1093101A).

The supporter of the catalyst disclosed in this invention is all kinds of clay, such as Kaolin. The binder is selected from one or mixture of two or three of silica sol, alumina sol and pseudoboehmite.

The FCC catalyst supplied by this invention can decrease the gasoline sulfur content in FCC process efficiently without affecting normal FCC operational conditions, due to the introduction of desulfurization component with vanadium-incorporated molecular sieves into catalyst. Comparing to the catalyst used in the art of alumina loaded with vanadium, in this invention vanadium is fixed efficiently in the skeleton of molecular sieves, which avoids the destruction of the active cracking component such as zeolite Y due to the lose of vanadium.

EMBODIMENTS

The following examples are used to explain the invention, which is not a limitation to the invention.

The sulfur content of the feedstocks used in the evaluation for the catalyst is 403 mg/L.

In the examples X-ray fluoroscopy is employed to characterize the chemical compositions of VS-n and VAPO-n molecular sieves in the catalyst. The crystal structures and C.R. of the molecular sieves are measured by XRD.

The molecular sieves with desulfurization property used in the catalysts of Examples 1-5 are VAPO-5 molecular sieves.

Example 1

Synthesis of VAPO-5 molecular sieves: 15 g alumina ($Al_2O_3$=65.8 wt %, Changling Catalyst Company) and 60 mL $H_2O$ were mixed together and stirred for 60 min firstly, then 14 g $H_3PO_4$ (85 wt %, Beijing Chemical Company) was dropped slowly into the mixture. After stirring for another 10 min 2.3 g $VOSO_4 \cdot 5H_2O$ (V=22%) in 2 g $H_2O$ was added immediately under stirring at room temperature. One hour later 16 mL Triethylamine template (TEA, 98%, Beijing Chemical Company) was added with rate of 1 mL/min and then stirred for another hour at ambient temperature. The mixture was put into a sealed stainless steel pressure vessel and crystallized dynamically at 175° C. for 72 h. The product obtained was washed with water and dried in air at 80° C.; then calcined programmely in a flowing air (120° C., 1 h; heated to 550° C. at 3° C./min. and cooled slowly to ambient temperature after holding for 4 h.); The XRD patterns of the product obtained display typical diffraction peaks of VAPO-5 molecular sieves. The molar ratio of Al/V is 51.

The composition of catalyst is 10 wt % VAPO-5, 47 wt % REUSY, 18 wt % silica sol and 25 wt % Kaolin. The synthetic VAPO-5 is added into a solution containing 10 wt % silica sol and then REUSY and Kaolin are added, all the materials were mixed together and spray-dried to obtain the catalyst A1.

The results of catalyst A1 and comparative catalyst DB-1 are shown in Table 1.

Comparative Example 1

The composition of the comparative catalyst DB-1 is 57 wt % REUSY ($a_0$=24.5 Å, $Re_2O_3$=68 wt %), 18 wt % silica sol and 25 wt % Kaolin.

TABLE 1

| | CATALYST | |
|---|---|---|
| | DB-1 | A1 |
| MA(800° C./8 h) | 64 | 64 |
| C/O | 1.29 | 1.29 |
| REACT TEMP./° C. | 500 | 500 |
| DRY GAS | 1.83 | 1.71 |
| LPG | 10.65 | 8.29 |
| GLN | 47.80 | 45.48 |
| LCO | 21.16 | 22.09 |
| SLURRY | 16.37 | 19.56 |
| COKE | 2.20 | 2.86 |
| TOTAL | 100.0 | 100.0 |
| CONV./m % | 62.47 | 58.35 |
| GLN + LCO/m % | 68.95 | 67.57 |
| GLN + LCO + LPG/m % | 79.60 | 75.86 |
| SLURRY/COKE | 7.45 | 6.84 |
| COKE/CONV. | 0.04 | 0.05 |
| SULFUR, mg/L | 318.7 | 176.3 |

As seen from Table 1, the desulfurization degree of catalyst A1 is much higher than the comparative catalyst DB-1 in which no vanadium-incorporated molecular sieves was added.

Example 2

Different from catalyst A1, REUSY molecular sieves were replaced by rare earth USY molecular sieves modified with ZnO which named as ZARY. The composition of ZARY is 6 wt % ZnO, 10 wt % $RE_2O_3$ and 84 wt % USY. The catalyst is numbered as A1'.

Comparative Example 2

Different from comparative catalyst DB-1, REUSY molecular sieves were replaced by ZARY molecular sieves. The results are shown in Table 2.

TABLE 2

| | CATALYST | |
|---|---|---|
| | DB-2 | A1' |
| MA(800° C./8 h) | 64 | 64 |
| C/O | 1.29 | 1.29 |
| REACT TEMP./° C. | 500 | 500 |
| DRY GAS | 2.01 | 1.99 |
| LPG | 12.35 | 12.23 |
| GLN | 49.48 | 49.29 |
| LCO | 20.21 | 20.33 |
| SLURRY | 14.15 | 14.27 |
| COKE | 1.80 | 1.89 |
| TOTAL | 100.0 | 100.0 |
| CONV./m % | 65.64 | 65.40 |
| GLN + LCO/m % | 69.69 | 69.62 |
| GLN + LCO + LPG/m % | 82.04 | 81.85 |
| SLURRY/COKE | 7.86 | 7.55 |
| COKE/CONV. | 0.03 | 0.03 |
| SULFUR, mg/L | 321.3 | 172.1 |

Example 3

The composition of catalyst A1" is 11.7 wt % VAPO-5, 47 wt % USY, 10 wt % ZRP (a kind of ZSM-5 molecular sieves modified by P and rare earth, Industry brand ZRP-7, Qilu Catalyst Company, $SiO_2/Al_2O_3=80$), 12 wt % silica sol and 19.3 wt % Kaolin. The results are shown in Table 3.

Comparative Example 3

The composition of comparative catalyst DB-3 is 47 wt % USY, 10 wt % ZRP, 18 wt % silica sol and 25 wt % Kaolin. The results are shown in Table 3.

TABLE 3

| | CATALYST | |
|---|---|---|
| | DB-3 | A1" |
| MA(800° C./8 h) | 64 | 64 |
| C/O | 1.29 | 1.29 |
| REACT TEMP./° C. | 500 | 500 |
| DRY GAS | 1.80 | 1.73 |
| LPG | 13.18 | 12.92 |
| GLN | 51.70 | 52.03 |
| LCO | 19.62 | 20.07 |
| SLURRY | 11.78 | 11.39 |
| COKE | 1.92 | 1.86 |
| TOTAL | 100.0 | 100.0 |
| CONV./m % | 68.60 | 68.54 |
| GLN + LCO/m % | 71.32 | 72.10 |
| GLN + LCO + LPG/m % | 84.50 | 85.02 |
| SLURRY/COKE | 6.14 | 6.12 |
| COKE/CONV. | 0.03 | 0.03 |
| SULFUR, mg/L | 319.4 | 171.6 |

Examples 4~7

The catalysts in examples 4~7 are named as A2, A3, A4 and A5 respectively. The compositions include ZARY 47 wt %, Kaolin 25 wt %, VAPO-5 15 wt %, 6 wt %, 3 wt % and 1 wt % with varied Al/V molar ratio of 150, 130, 80 and 15, and silica sol 13 wt %, 22 wt %, 25 wt % and 24 wt % respectively. The cracking results from the small device for evaluation of GLN+LCN are shown in Table 4.

TABLE 4

| CATALYST | DB-1 | A2 | A3 | A4 | A5 |
|---|---|---|---|---|---|
| Al/V(mol) | | 150 | 130 | 80 | 15 |
| MA(800° C./8 h) | 64 | 64 | 64 | 64 | 64 |
| C/O | 1.29 | 1.29 | 1.29 | 1.29 | 1.29 |
| REACT TEMP./° C. | 500 | 500 | 500 | 500 | 500 |
| DRY GAS | 1.83 | 1.70 | 1.73 | 1.80 | 1.82 |
| LPG | 10.65 | 8.41 | 9.55 | 10.23 | 10.33 |
| GLN | 47.80 | 46.96 | 46.70 | 46.82 | 46.23 |
| LCO | 21.16 | 23.02 | 21.17 | 21.13 | 20.97 |
| SLURRY | 16.37 | 19.43 | 16.33 | 16.74 | 15.89 |
| COKE | 2.20 | 2.18 | 2.15 | 2.17 | 2.21 |
| TOTAL | 100.0 | 100.0 | 100.0 | 100.0 | 100.0 |
| CONV./m % | 62.47 | 59.25 | 60.13 | 61.02 | 60.59 |
| GLN + LCO/m % | 68.95 | 69.98 | 67.87 | 67.95 | 67.2 |
| GLN + LCO + LPG/m % | 79.60 | 78.39 | 77.42 | 78.18 | 77.53 |
| SLURRY/COKE | 7.45 | 8.91 | 7.60 | 7.71 | 7.19 |
| COKE/CONV. | 0.04 | 0.04 | 0.04 | 0.04 | 0.04 |
| SULFUR, mg/L | 318.7 | 181.4 | 165.3 | 169.4 | 173.0 |

As seen from Table 4, the desulfurization degrees of catalysts A2~A5 are much higher than the comparative catalyst DB-1 in which no vanadium-incorporated molecular sieves was added.

The molecular sieves with desulfurization property used in the catalysts of Examples 8-12 are VAPO-11 molecular sieves.

Example 8

Synthesis of VAPO-11 molecular sieves; 15 g Alumina ($Al_2O_3$=65.8 wt %, Changling Catalyst Company) and 60 mL $H_2O$ were mixed together and stirred for 60 min, then 14 g $H_3PO_4$ (85 wt %, Beijing Chemical Company) was dropped slowly into the mixture. After stirring for another 10 min 2.1 g $VOSO_4.5H_2O$ (V=22%) in 2 g $H_2O$ was added immediately under stirring. One hour later 13.6 mL Di-n-propylamine template (DPA, 98%, Beijing Chemical Company) was added at the rate of 1 mL/min and then stirred for another hour at ambient temperature. The mixture was put into a sealed stainless steel pressure vessel and crystallized dynamically at 200° C. for 96 h. The XRD patterns of the product obtained possess typical diffraction peaks of VAPO-11 molecular sieves. The molar ratio of Al/V is 53.

REUSY molecular sieve, silica sol and kaolin are added into VAPO-11 synthesized as mentioned above.

The composition of catalyst A6 is 10 wt % VAPO-11, 47 wt % REUSY, 18 wt % silica sol and 25 wt % Kaolin. The preparation procedure is just like that of Example 1, in which all the materials were mixed together and sprayed out to obtain catalyst A6.

The cracking results of catalyst A6 and comparative catalyst DB-1 are shown in Table 5.

Comparative Example 4

This comparative example depicts the comparative catalyst prepared by the method declosed in U.S. Pat. No. 6,482,315.

0.2 g $NH_4VO_3$ was dissolved in 20 mL deionized $H_2O$, then added into the beaker with 10 g pseudoboehmite and stirred for 1 h. The desulfurization component was obtained after drying.

The comparative catalyst DB-4 prepared by using this desulfurization component is composed of 10 wt % desulfurization component, 47 wt % REUSY, 18 wt % silica sol and 25 wt % Kaolin.

The cracking results of DB-4 are also shown in Table 5.

TABLE 5

| | CATALYST | | |
|---|---|---|---|
| | DB-1 | DB-4 | A6 |
| MA(800° C./8 h) | 64 | 64 | 64 |
| C/O | 1.29 | 1.29 | 1.29 |
| REACT TEMP./° C. | 500 | 500 | 500 |
| DRY GAS | 1.83 | 4.47 | 1.37 |
| LPG | 10.65 | 9.35 | 8.13 |
| GLN | 47.80 | 44.80 | 41.57 |
| LCO | 21.16 | 18.23 | 19.89 |
| SLURRY | 16.37 | 16.12 | 26.30 |
| COKE | 2.20 | 7.03 | 2.74 |
| TOTAL | 100.0 | 100.0 | 100.0 |
| CONV./m % | 62.47 | 53.55 | 53.81 |
| GLN + LCO/m % | 68.95 | 63.03 | 61.46 |
| GLN + LCO + LPG/m % | 79.60 | 72.38 | 69.59 |
| SLURRY/COKE | 7.45 | 2.29 | 9.58 |
| COKE/CONV. | 0.04 | 0.13 | 0.05 |
| SULFUR, mg/L | 318.7 | 308.6 | 217.0 |

As seen from Table 5, the desulfurization degree of catalyst A6 is much higher than both the comparative catalyst DB-1 that has no vanadium-incorporated molecular sieves and the comparative catalyst DB-4 loaded with vanadium supplied by the available technology.

The following results indicate the stability of the catalysts supplied by this invention.

The comparative catalyst DB-4 and catalyst A6 were aged hydrothermally at 800° C. for 8 h, 12 h, 16 h and 20 h respectively. The vanadium contents and the C.R. of zeolite Y in the aged catalysts were measured. The measurement results are shown in Table 6.

TABLE 6

| Hydrothermal | DB-4 | | A6 | |
|---|---|---|---|---|
| ageing time (h) | V (wt %) | C.R. (%) | V (wt %) | C.R. (%) |
| Fresh agent | 0.1 | 100 | 0.1 | 100 |
| 8 | 0.1 | 99 | 0.1 | 99 |
| 12 | 0.1 | 90 | 0.1 | 99 |
| 16 | 0.09 | 88 | 0.1 | 99 |
| 20 | 0.09 | 84 | 0.1 | 99 |

As seen from Table 6, the vanadium content on $Al_2O_3$ of comparative catalyst DB-4 decreases with the time of hydrothermal aging and the C.R. of zeolite Y decreased as well; but the vanadium content and the C.R. of zeolite Y kept unchanged in catalyst A6.

Examples 9~12

The catalysts in examples 9~12 are named as A7, A8, A9 and A10 respectively. Comparing to catalyst A6, VAPO-11 molecular sieves used here have different Al/V molar ratios as 180, 70, 23 and 16. The contents of VAPO-11 are 15 wt %, 6 wt %, 3 wt % and 1 wt % respectively and the corresponding contents of silica sol are 13 wt %, 22 wt %, 25 wt % and 24 wt %. The cracking results of catalysts A7~A10 and comparative catalyst DB-1 are shown in Table 7.

TABLE 7

| CATALYST | DB-1 | A7 | A8 | A9 | A10 |
|---|---|---|---|---|---|
| Al/V(mol) | | 180 | 70 | 23 | 16 |
| MA(800° C./8 h) | 64 | 64 | 64 | 64 | 64 |
| C/O | 1.29 | 1.29 | 1.29 | 1.29 | 1.29 |
| REACT TEMP./° C. | 500 | 500 | 500 | 500 | 500 |
| DRY GAS | 1.83 | 1.33 | 1.36 | 1.37 | 1.35 |
| LPG | 10.65 | 8.16 | 8.11 | 8.10 | 8.12 |
| GLN | 47.80 | 41.58 | 41.50 | 41.53 | 41.38 |
| LCO | 21.16 | 19.91 | 19.90 | 19.83 | 19.87 |
| SLURRY | 16.37 | 26.32 | 26.14 | 26.42 | 26.51 |
| COKE | 2.20 | 2.70 | 2.99 | 2.75 | 2.77 |
| TOTAL | 100.0 | 100.0 | 100.0 | 100.0 | 100.0 |
| CONV./m % | 62.47 | 53.77 | 53.96 | 53.75 | 53.62 |
| GLN + LCO/m % | 68.95 | 61.49 | 61.40 | 61.36 | 61.25 |
| GLN + LCO + LPG/m % | 79.60 | 69.65 | 69.51 | 69.46 | 69.37 |
| SLURRY/COKE | 7.45 | 9.75 | 8.74 | 9.61 | 9.57 |
| COKE/CONV. | 0.04 | 0.05 | 0.06 | 0.05 | 0.05 |
| SULFUR, mg/L | 318.7 | 217.0 | 218.3 | 240.1 | 284.3 |

As seen from Table 7, the desulfurization degrees of catalysts A7~A10 are much higher than the comparative catalyst DB-1 in which no vanadium-incorporated molecular sieves was added.

The components for desulfurization used in the catalysts of Examples 13-17 are VS-1 molecular sieves.

Example 13

1.0 g $V_2O_5$ was dissolved in 50 g $(C_4H_9)_4NOH$, then 15 g silica gel as silicon sources was added into the solution and mixed evenly. The products were obtained after crystallization at 160° C. for 10 days and calcined at 530° C. for 5 h. The XRD patterns of the products obtained possess typical diffraction peaks of VS-1 molecular sieves. The molar ratio of Si/V is 52.

VS-1 synthesized as mentioned above, REUSY molecular sieve, silica sol and Kaolin were added by the procedure mentioned in example 1 to obtain the catalyst, in which VS-1 is 10 wt %, REUSY molecular sieve is 47 wt %, silica sol is 18 wt % and Kaolin is 25 wt %. The products obtained were spray-dried to obtain the catalyst which named as A11.

The cracking results of catalyst A11 and comparative catalyst DB-1 are shown in Table 8.

TABLE 8

| | CATALYST | |
|---|---|---|
| | DB-1 | A11 |
| MA(800° C./8 h) | 64 | 64 |
| C/O | 1.29 | 1.21 |
| REACT TEMP./° C. | 500 | 500 |
| DRY GAS | 1.83 | 1.45 |
| LPG | 10.65 | 9.91 |
| GLN | 47.80 | 41.68 |
| LCO | 21.16 | 19.72 |
| SLURRY | 16.37 | 24.59 |
| COKE | 2.20 | 2.65 |
| TOTAL | 100.0 | 100.0 |
| CONV./m % | 62.47 | 55.69 |
| GLN + LCO/m % | 68.95 | 61.40 |
| GLN + LCO + LPG/m % | 79.60 | 71.31 |
| SLURRY/COKE | 7.45 | 9.60 |
| COKE/CONV. | 0.04 | 0.05 |
| SULFUR, mg/L | 318.7 | 210.0 |

As seen from Table 8, the desulfurization degree of catalyst A11 is much higher than the comparative catalyst DB-1 in which no vanadium-incorporated molecular sieves was added.

Examples 14~17

The catalysts in examples 14~17 are named as A12, A13, A14 and A15 respectively. Comparing to catalyst A11, VS-1 molecular sieves employed here have different Si/V molar ratios as 178, 132, 72 and 40. The contents of VS-1 are 15 wt %, 6 wt %, 3 wt % and 1 wt % respectively and the corresponding contents of silica sol are 13 wt %, 22 wt %, 25 wt % and 24 wt %. The cracking results are shown in Table 9.

TABLE 9

| | CATALYST | | | | |
|---|---|---|---|---|---|
| | DB-1 | A12 | A13 | A14 | A15 |
| Si/V(mol) | | 178 | 132 | 72 | 40 |
| MA(800° C./8 h) | 64 | 64 | 64 | 64 | 64 |
| C/O | 1.29 | 1.21 | 1.21 | 1.21 | 1.21 |
| REACT TEMP./° C. | 500 | 500 | 500 | 500 | 500 |
| DRY GAS | 1.83 | 1.44 | 1.46 | 1.45 | 1.43 |
| LPG | 10.65 | 9.03 | 9.02 | 9.05 | 9.10 |
| GLN | 47.80 | 43.85 | 43.82 | 43.85 | 43.89 |
| LCO | 21.16 | 18.53 | 18.46 | 18.49 | 18.50 |
| SLURRY | 16.37 | 24.95 | 24.50 | 24.49 | 24.43 |
| COKE | 2.20 | 2.20 | 2.74 | 2.67 | 2.65 |
| TOTAL | 100.0 | 100.0 | 100.0 | 100.0 | 100.0 |
| CONV./m % | 62.47 | 56.52 | 57.04 | 57.02 | 57.07 |
| GLN + LCO/m % | 68.95 | 62.38 | 62.28 | 62.34 | 62.39 |
| GLN + LCO + LPG/m % | 79.60 | 71.41 | 71.30 | 71.39 | 71.49 |
| SLURRY/COKE | 7.45 | 11.3 | 8.94 | 9.17 | 9.22 |
| COKE/CONV. | 0.04 | 0.05 | 0.05 | 0.11 | 0.11 |
| SULFUR, mg/L | 318.7 | 201.3 | 214.3 | 221.4 | 293.7 |

As seen from Table 9, the desulfurization degrees of catalysts A12~A15 are much higher than the comparative catalyst DB-1 in which no vanadium-incorporated molecular sieves was added.

The components for desulfurization used in the catalysts of Examples 18-22 are VS-2 molecular sieves.

Example 18

1.8 g $V_2O_5$ was dissolved in 30 g $(C_4H_9)_4NOH$ and 10 g $H_2O$, then 15 g silica gel as silicon sources was added into the solution and mixed evenly. The products were obtained after crystallization at 180° C. for 10 days and calcined at 530° C. for 5 h. The XRD patterns of the products obtained possess typical diffraction peaks of VS-2 molecular sieves. The molar ratio of Si/V is 25.

The composition of catalyst A16 is 10 wt % VS-2, 47 wt % REUSY, 18 wt % silica sol and 25 wt % Kaolin.

The cracking results are shown in Table 10.

TABLE 10

| | CATALYST | |
|---|---|---|
| | DB-1 | A16 |
| MA(800° C./8 h) | 64 | 64 |
| C/O | 1.29 | 1.28 |
| REACT TEMP./° C. | 500 | 500 |
| DRY GAS | 1.83 | 1.56 |
| LPG | 10.65 | 12.64 |
| GLN | 47.80 | 39.77 |
| LCO | 21.16 | 18.45 |
| SLURRY | 16.37 | 24.90 |
| COKE | 2.20 | 2.68 |
| TOTAL | 100.0 | 100.0 |
| CONV./m % | 62.47 | 56.65 |
| GLN + LCO/m % | 68.95 | 58.22 |
| GLN + LCO + LPG/m % | 79.60 | 70.86 |
| SLURRY/COKE | 7.45 | 9.29 |
| COKE/CONV. | 0.04 | 0.05 |
| SULFUR, mg/L | 318.7 | 216.0 |

As seen from Table 10, the desulfurization degree of catalyst A16 is much higher than the comparative catalyst DB-1 in which no vanadium-incorporated molecular sieves was added.

Examples 19~22

The catalysts in examples 19~22 are named as A17, A18, A19, A20 respectively. Different from catalyst A16, VS-2 molecular sieves employed here have different Si/V molar ratios as 200, 140, 103 and 33. The contents of VS-2 are 13 wt %, 22 wt %, 25 wt % and 24 wt % respectively and the corresponding contents of silica sol are 15 wt %, 6 wt %, 3 wt % and 4 wt %.

The cracking results of these catalysts and comparative catalyst DB-1 are shown in Table 11.

TABLE 11

| CATALYST | DB-1 | A17 | A18 | A19 | A20 |
|---|---|---|---|---|---|
| Si/V(mol) | | 200 | 140 | 103 | 33 |
| MA(800° C./8 h) | 64 | 64 | 64 | 64 | 64 |
| C/O | 1.29 | 1.40 | 1.40 | 1.40 | 1.40 |
| REACT TEMP./° C. | 500 | 500 | 500 | 500 | 500 |
| DRY GAS | 1.83 | 2.01 | 1.89 | 1.92 | 1.87 |
| LPG | 10.65 | 10.11 | 10.02 | 9.89 | 9.82 |
| GLN | 47.80 | 42.12 | 42.39 | 42.47 | 42.57 |
| LCO | 21.16 | 18.47 | 18.48 | 18.47 | 18.49 |
| SLURRY | 16.37 | 24.24 | 24.21 | 24.23 | 24.25 |
| COKE | 2.20 | 3.05 | 3.01 | 3.02 | 3.00 |
| TOTAL | 100.0 | 100.0 | 100.0 | 100.0 | 100.0 |
| CONV./m % | 62.47 | 57.29 | 57.31 | 57.28 | 57.26 |
| GLN + LCO/m % | 68.95 | 60.59 | 60.87 | 60.94 | 61.06 |
| GLN + LCO + LPG/m % | 79.60 | 70.70 | 70.89 | 70.84 | 70.88 |
| SLURRY/COKE | 7.45 | 7.95 | 8.04 | 8.02 | 8.08 |
| COKE/CONV. | 0.04 | 0.05 | 0.05 | 0.05 | 0.05 |
| SULFUR, mg/L | 318.7 | 216.0 | 203.6 | 189.2 | 169.4 |

As seen from Table 11, the desulfurization degrees of catalysts A19~A22 are much higher than the comparative catalyst DB-1 in which no vanadium-incorporated molecular sieves was added.

The components for desulfurization used in the catalysts of Examples 23-30 are mixtures of vanadium-incorporated molecular sieves.

Examples 23~26

The catalysts in examples 23~26 are named as A21, A22, A23, and A24 respectively. The compositions in catalysts A21~A24 are 47 wt % REUSY, 18 wt % silica sol, 25 wt % Kaolin, VAPO-11 (Al/V=73) 9 wt %, 6 wt %, 3 wt % and 1 wt % respectively, VS-2 (Si/V=75) 1 wt %, 3 wt %, 6 wt % and 9 wt % respectively.

The cracking results of catalysts A21~A24 and comparative catalyst DB-1 are shown in Table 12.

TABLE 12

| CATALYST | DB-1 | A21 | A22 | A23 | A24 |
|---|---|---|---|---|---|
| MA(800° C./8 h) | 64 | 64 | 64 | 64 | 64 |
| C/O | 1.29 | 1.40 | 1.40 | 1.40 | 1.40 |
| REACT TEMP./° C. | 500 | 500 | 500 | 500 | 500 |
| DRY GAS | 1.83 | 1.89 | 1.84 | 1.85 | 1.83 |
| LPG | 10.65 | 10.07 | 9.87 | 9.78 | 7.83 |
| GLN | 47.80 | 46.70 | 46.72 | 46.74 | 46.76 |
| LCO | 21.16 | 20.17 | 20.18 | 20.18 | 21.03 |
| SLURRY | 16.37 | 18.28 | 18.53 | 18.61 | 19.70 |
| COKE | 2.20 | 2.89 | 2.86 | 2.84 | 2.85 |
| TOTAL | 100.0 | 100.0 | 100.0 | 100.0 | 100.0 |
| CONV./m % | 62.47 | 61.55 | 61.29 | 61.21 | 59.27 |
| GLN + LCO/m % | 68.95 | 66.87 | 66.90 | 66.92 | 67.79 |
| GLN + LCO + LPG/m % | 79.60 | 76.94 | 76.77 | 76.70 | 75.62 |
| SLURRY/COKE | 7.45 | 6.32 | 6.48 | 6.55 | 6.90 |
| COKE/CONV. | 0.04 | 0.05 | 0.05 | 0.05 | 0.05 |
| SULFUR, mg/L | 318.7 | 215.3 | 211.2 | 208.4 | 201.5 |

As seen from Table 12, the desulfurization degrees of catalysts A21~A24 are much higher than the comparative catalyst DB-1 in which no vanadium-incorporated molecular sieves was added.

Examples 27~30

The catalysts in examples 27~30 were prepared according to example 1 and are named as A25, A26, A27, and A28 respectively. The compositions of these catalysts are 47 wt % HY, 18 wt % silica sol, 25 wt % Kaolin, VAPO-5 (Al/V(mol)=46) 9 wt %, 6 wt %, 3 wt % and 1 wt % respectively, VS-1 (Si/V(mol)=75) 1 wt %, 3 wt %, 6 wt % and 9 wt % respectively.

The cracking results of catalysts A25~A28 and comparative catalyst DB-1 are shown in Table 13.

TABLE 13

| CATALYST | DB-1 | A25 | A26 | A27 | A28 |
|---|---|---|---|---|---|
| MA(800° C./8 h) | 64 | 64 | 64 | 64 | 64 |
| C/O | 1.29 | 1.40 | 1.40 | 1.40 | 1.40 |
| REACT TEMP./° C. | 500 | 500 | 500 | 500 | 500 |
| DRY GAS | 1.83 | 1.98 | 2.02 | 1.95 | 1.96 |
| LPG | 10.65 | 10.12 | 10.03 | 10.01 | 10.19 |
| GLN | 47.80 | 42.15 | 42.13 | 42.25 | 42.30 |
| LCO | 21.16 | 18.52 | 18.48 | 18.46 | 18.47 |
| SLURRY | 16.37 | 24.20 | 24.20 | 24.21 | 24.19 |
| COKE | 2.20 | 3.03 | 3.14 | 2.94 | 2.89 |
| TOTAL | 100.0 | 100.0 | 100.0 | 100.0 | 100.0 |
| CONV./m % | 62.47 | 57.28 | 57.32 | 57.15 | 57.34 |
| GLN + LCO/m % | 68.95 | 60.67 | 60.61 | 60.71 | 60.77 |
| GLN + LCO + LPG/m % | 79.60 | 70.79 | 70.64 | 70.72 | 70.66 |
| SLURRY/COKE | 7.45 | 8.00 | 7.70 | 8.23 | 8.37 |
| COKE/CONV. | 0.04 | 0.05 | 0.05 | 0.06 | 0.06 |
| SULFUR, mg/L | 318.7 | 220.3 | 211.3 | 208.4 | 200.1 |

As seen from Table 13, the desulfurization degrees of catalysts A25~A28 are much higher than the comparative catalyst DB-1 in which no vanadium-incorporated molecular sieves was added.

The invention claimed is:

1. A composition for desulfurization comprising one or more molecular sieves, a supporter, a binder, and a zeolite, wherein the molecular sieves have a molecular sieve skeleton and vanadium is incorporated into the molecular sieve skeleton, and the molecular sieve is at least one of VS-n, VAPO-n, or VSAPO.

2. The composition according to claim 1, wherein the molecular sieves are present in 1 to 20 weight percent of the composition.

3. The composition according to claim 1, wherein the ratio of zeolite to molecular sieves is 1 to 50 by weight.

4. The composition according to claim 1, wherein the VS-n is VS-1 or VS-2 and has silicon and vanadium and the molar ratio of Si to V is from 10:1 to 300:1.

5. The composition according to claim 1, wherein the VAPO-n is VAPO-5, VAPO-11, VAPO-17, or VAPO-31 and has aluminum and vanadium and the molar ratio of Al to V is from 10:1 to 300:1.

6. The composition according to claim 1, wherein the zeolite is a large pore size zeolite or an intermediate pore size zeolite.

7. The composition according to claim 1, wherein the zeolite is zeolite Y, ZSM-5, or a combination thereof.

8. The composition according to claim 7, wherein the zeolite Y is USY or REUSY, or is modified by metal oxides.

9. The composition according to claim 7, wherein the ZSM-5 is modified by a rare earth or by a rare earth and phosphorus.

10. The composition according to claim 1, wherein the supporter is clay.

11. The composition according to claim 1, wherein the binder is at least one of silica sol, alumina sol, or pseudoboehmite.

* * * * *